United States Patent
Upton, IV

(10) Patent No.: US 6,742,054 B1
(45) Date of Patent: May 25, 2004

(54) METHOD OF EXECUTING A DATA TRANSFORMATION SPECIFICATION

(75) Inventor: Francis R. Upton, IV, Oakland, CA (US)

(73) Assignee: Vitria Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/544,973

(22) Filed: Apr. 7, 2000

(51) Int. Cl.[7] ................................................. G06F 3/00
(52) U.S. Cl. ................................ 710/6; 710/29; 710/33
(58) Field of Search ........................... 707/10, 103, 104, 707/200, 201, 202, 203, 204; 395/500, 612; 710/5, 6, 29, 33

(56) References Cited

U.S. PATENT DOCUMENTS

| | | | |
|---|---|---|---|
| 5,233,513 A | * | 8/1993 | Doyle .............................. 705/7 |
| 5,557,798 A | | 9/1996 | Skeen et al. |
| 5,596,746 A | * | 1/1997 | Shen et al. .................. 707/101 |
| 5,884,317 A | | 3/1999 | Cline et al. |
| 5,915,259 A | | 6/1999 | Murata |
| 5,926,637 A | | 7/1999 | Cline et al. |
| 5,960,421 A | | 9/1999 | Cline et al. |
| 5,960,425 A | | 9/1999 | Buneman et al. |
| 5,970,490 A | * | 10/1999 | Morgenstern ................. 707/10 |
| 6,006,277 A | | 12/1999 | Talati et al. |
| 6,014,147 A | | 1/2000 | Politis et al. |
| 6,029,178 A | * | 2/2000 | Martin et al. ................ 707/201 |
| 6,038,601 A | | 3/2000 | Lambert et al. |
| 6,108,676 A | | 8/2000 | Nakatsuyama |
| 6,115,744 A | | 9/2000 | Robins et al. |
| 6,128,742 A | | 10/2000 | Felt |
| 6,216,151 B1 | | 4/2001 | Antoun |
| 6,236,999 B1 | | 5/2001 | Jacobs et al. |
| 6,253,257 B1 | | 6/2001 | Dundon |
| 6,298,354 B1 | * | 10/2001 | Saulpaugh et al. ...... 707/103 R |
| 6,349,298 B1 | | 2/2002 | Malone et al. |

FOREIGN PATENT DOCUMENTS

GB     2 264 186 A     8/1993

OTHER PUBLICATIONS

European Search Report dated Feb. 6, 2003 (EP 01 30 3271).

* cited by examiner

*Primary Examiner*—Jeffrey Gaffin
*Assistant Examiner*—Angel Casiano
(74) *Attorney, Agent, or Firm*—Nixon Peabody, LLP; Marc S. Kaufman

(57) ABSTRACT

A computer-implemented process for transforming an input message to an output message including reading transformation configuration information, reading an input message, creating output message data corresponding to each output schema node, calculating a number of reasons to continue for each schema node, performing the steps until the number of reasons to continue becomes zero, and writing the output message.

9 Claims, 10 Drawing Sheets

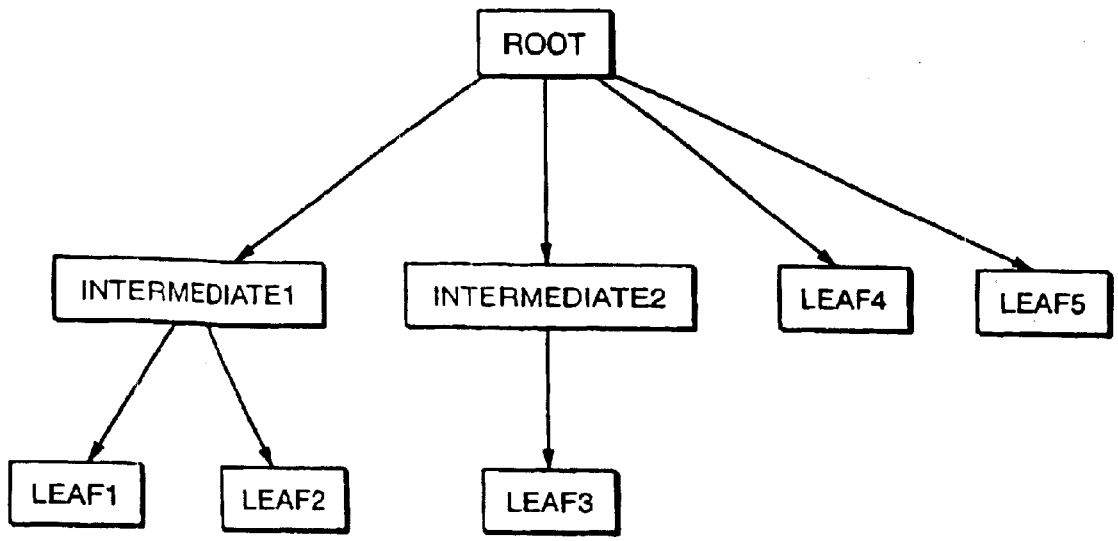
FIG._1     PRIOR ART
```
Root
    Intermediate1
        Leaf1
        Leaf2
    Intermediate2
        Leaf3
    Leaf4
    Leaf5
```
FIG._2     PRIOR ART

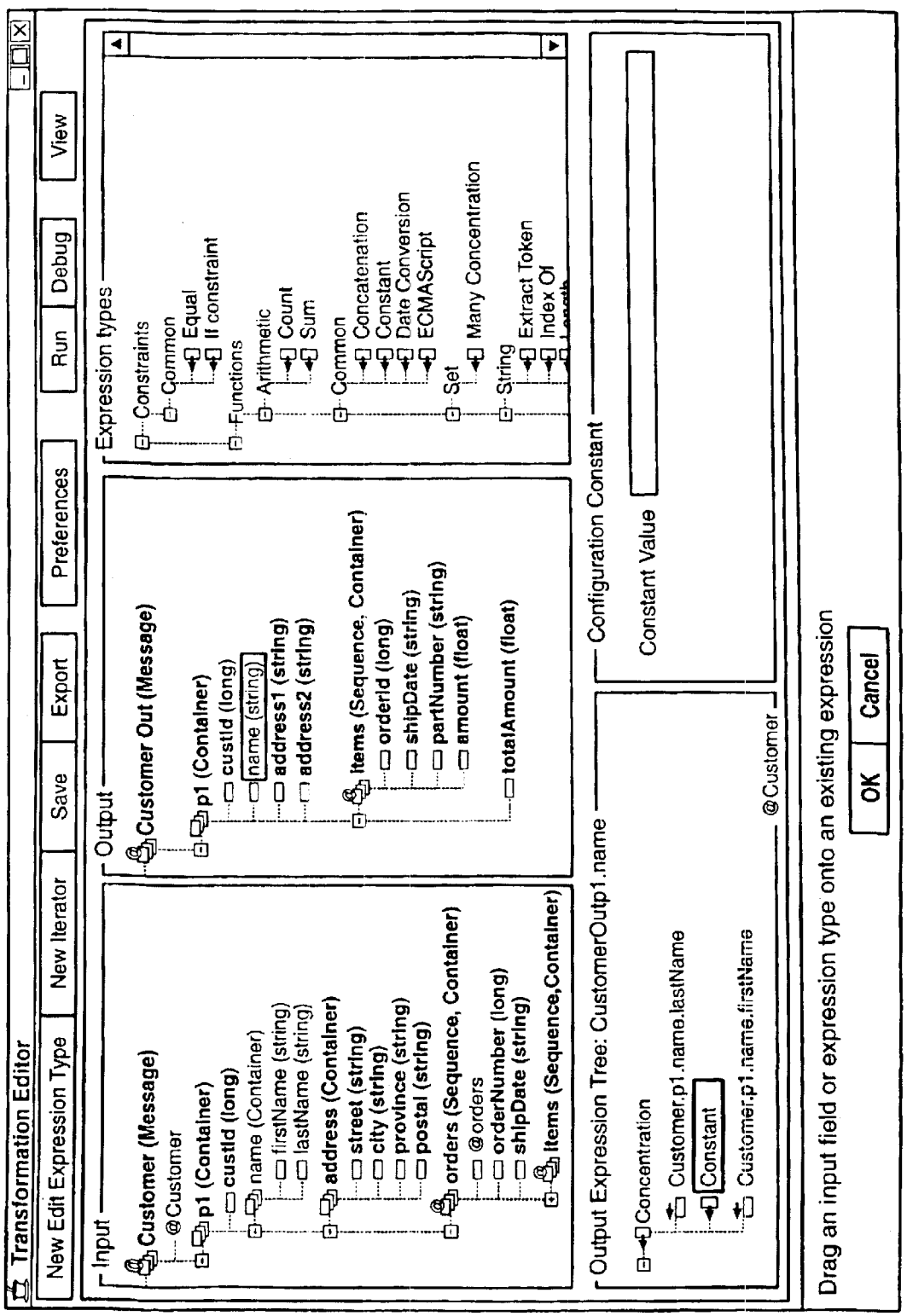
FIG._3

ROOT EXPRESSION

| Function or Field reference |
|---|

FIELD REFERENCE

| <name of Field reference> <br>    [Constraint] |
|---|

FUNCTION

| <name of Function> <br>    [Constraint] <br>    [Parameter1] <br>    [ParameterN] |
|---|

CONSTRAINT

| <name of Constraint> <br>    [Parameter1] <br>    [ParameterN] |
|---|

PARAMETER

| Function or Formal parameter or Field reference |
|---|

FORMAL PARAMETER

| <name of Formal parameter> <br>    [Constraint] <br>    Function or Field reference |
|---|

*FIG._4*

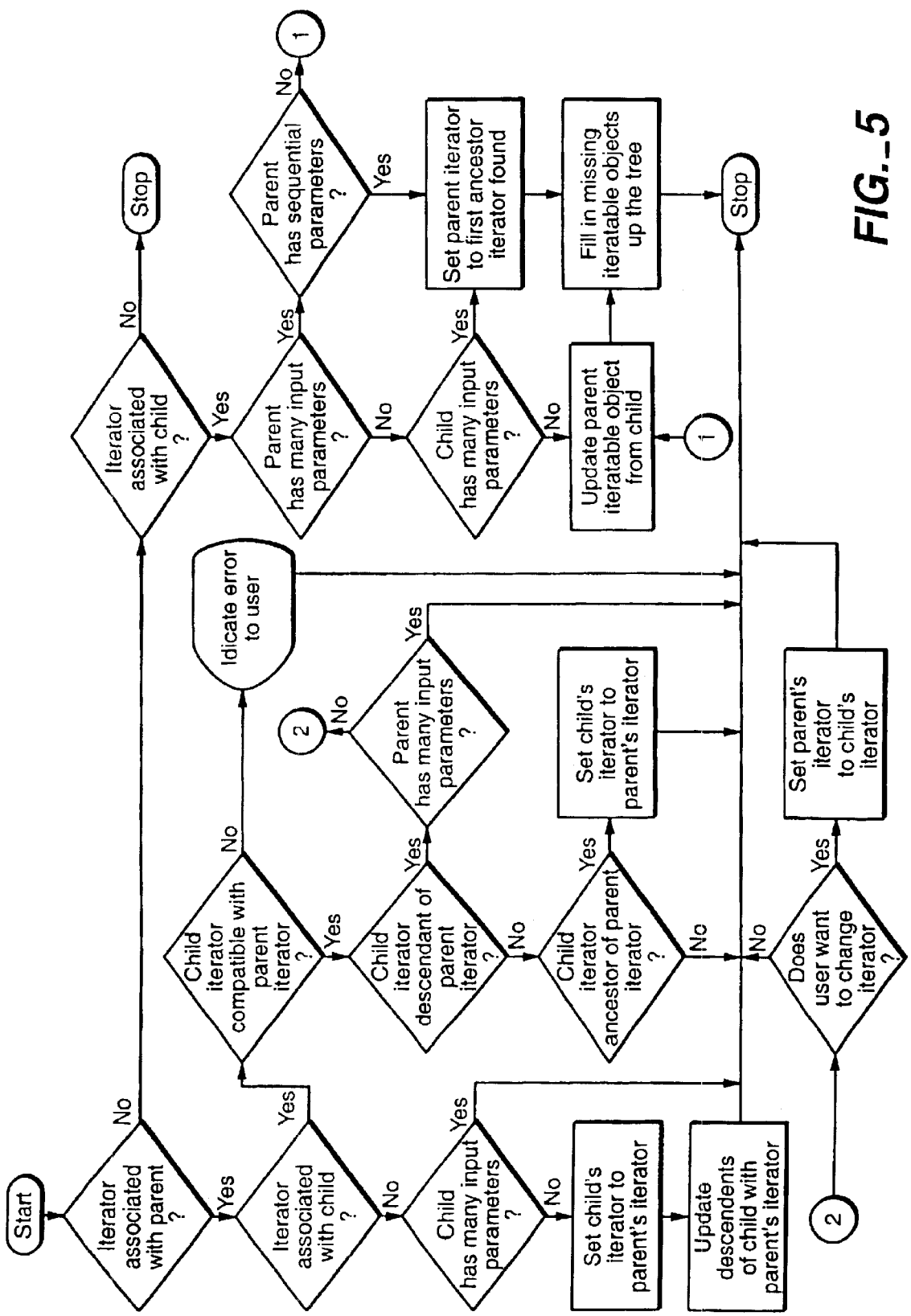
FIG._5

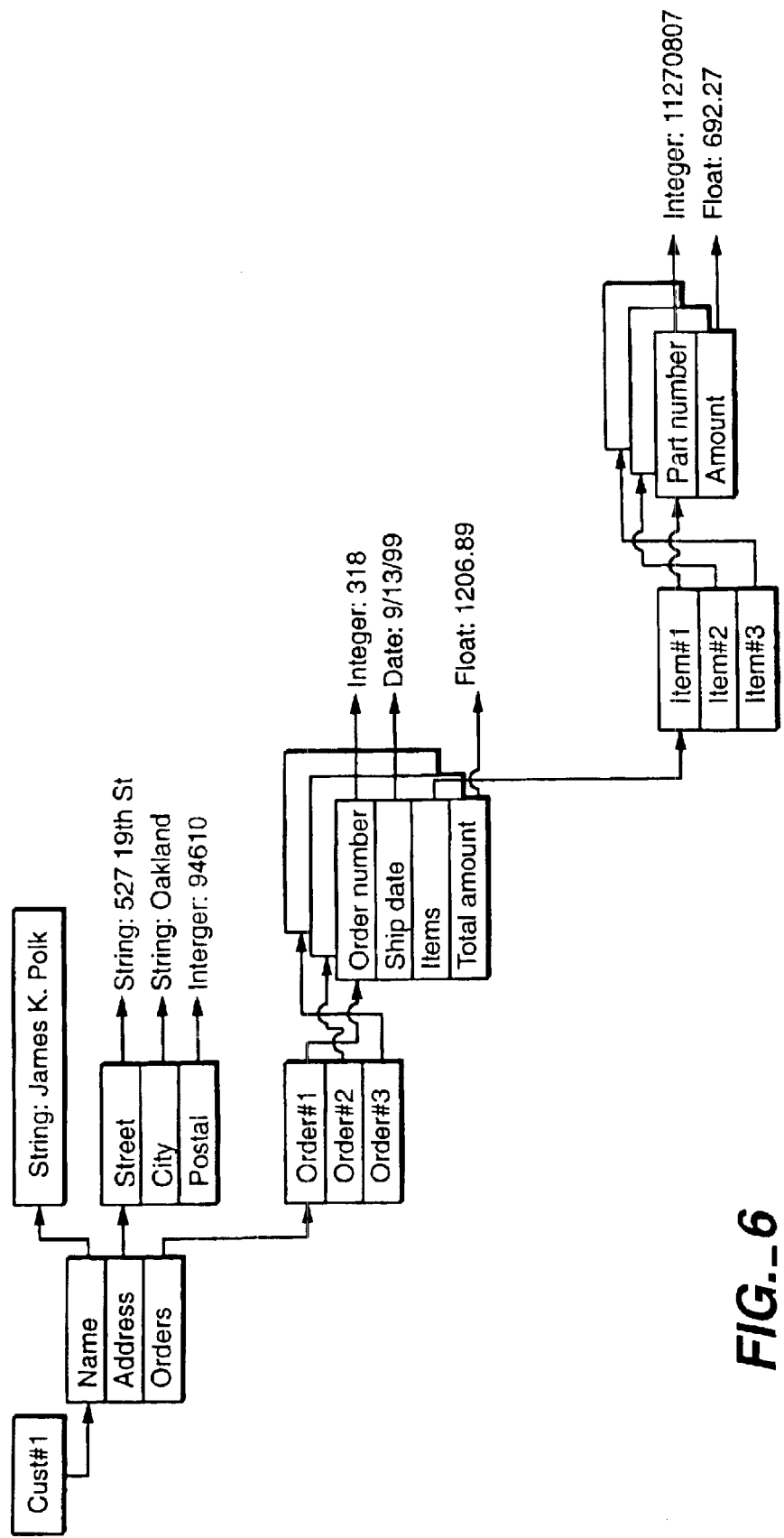
FIG._6

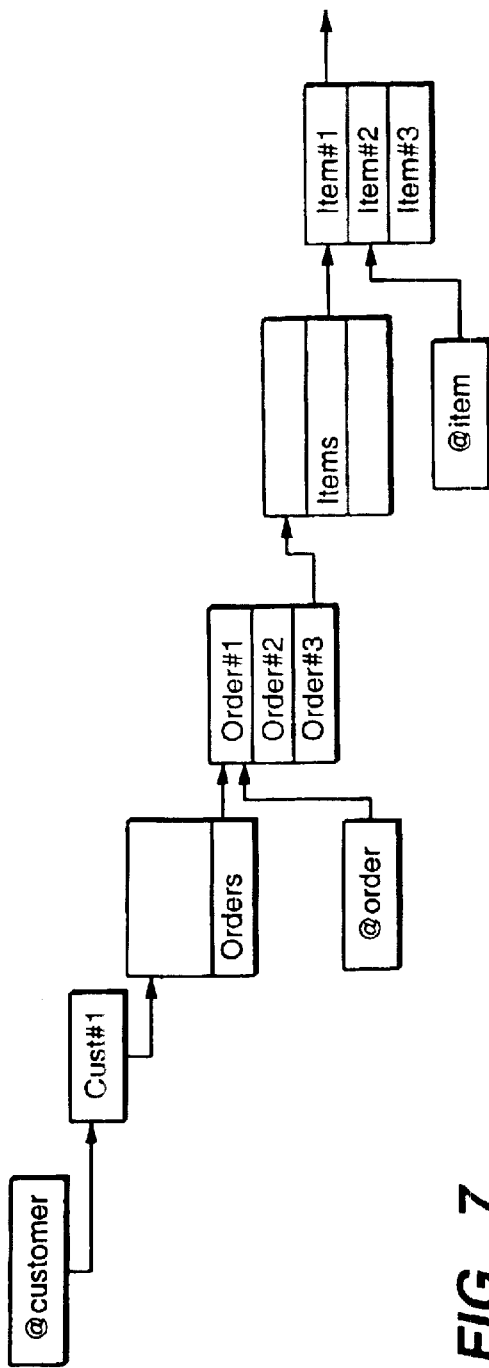
FIG._7
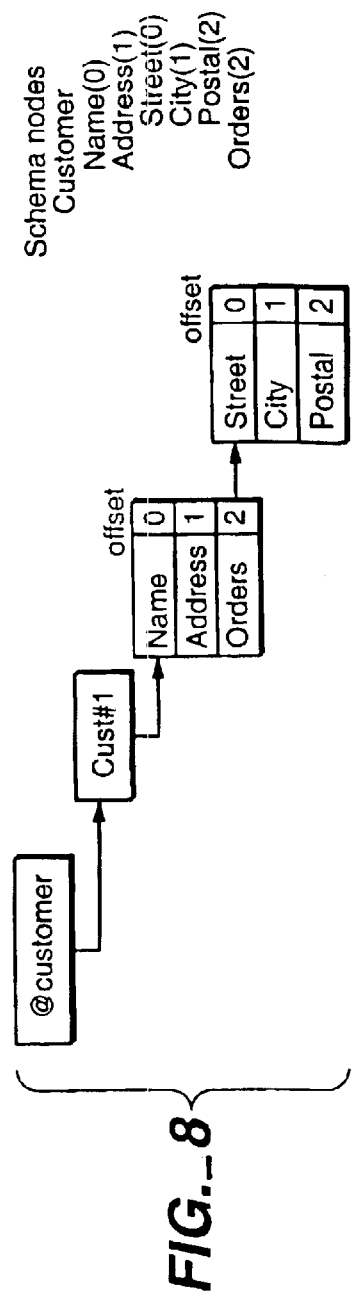
FIG._8

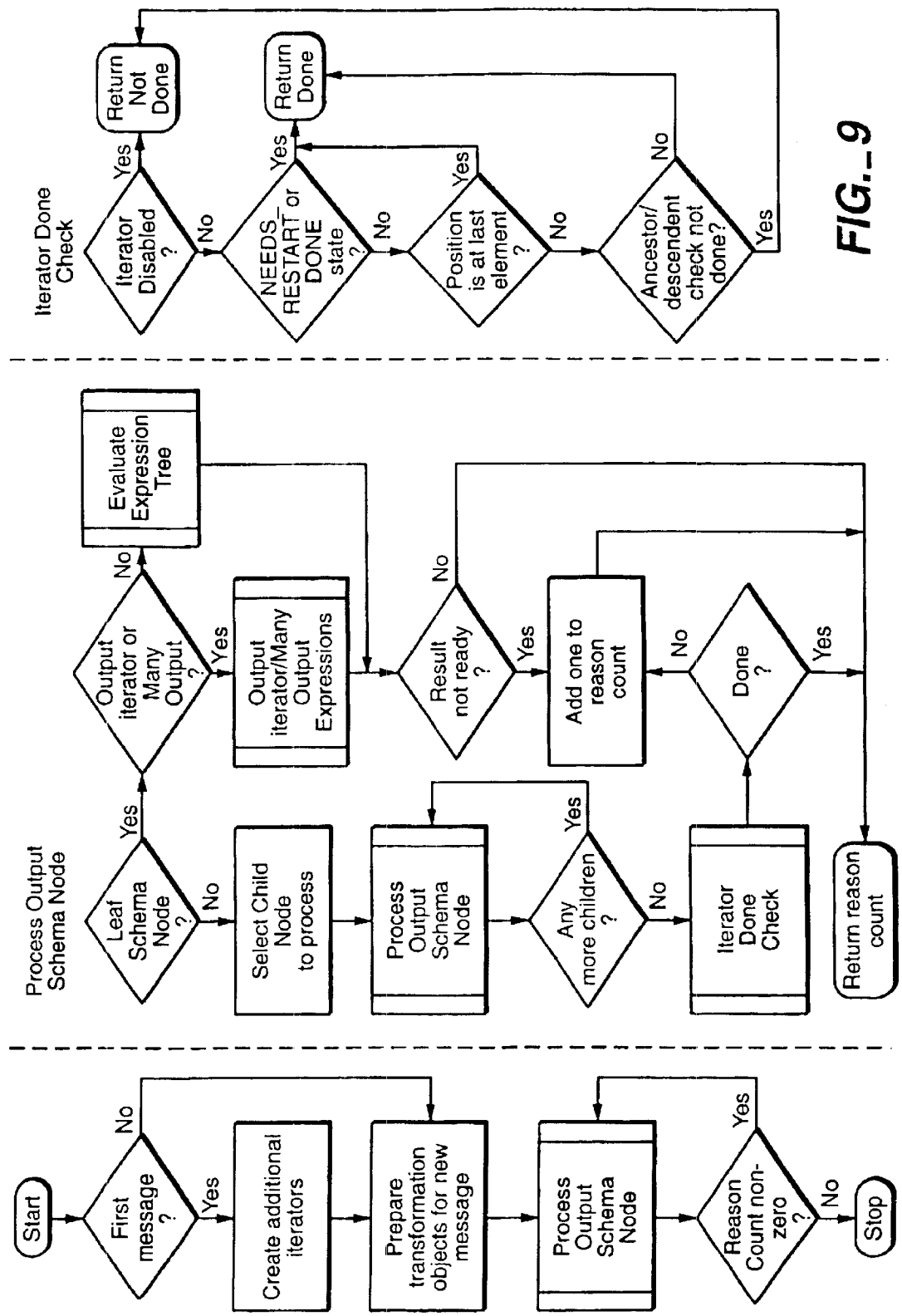
FIG._9

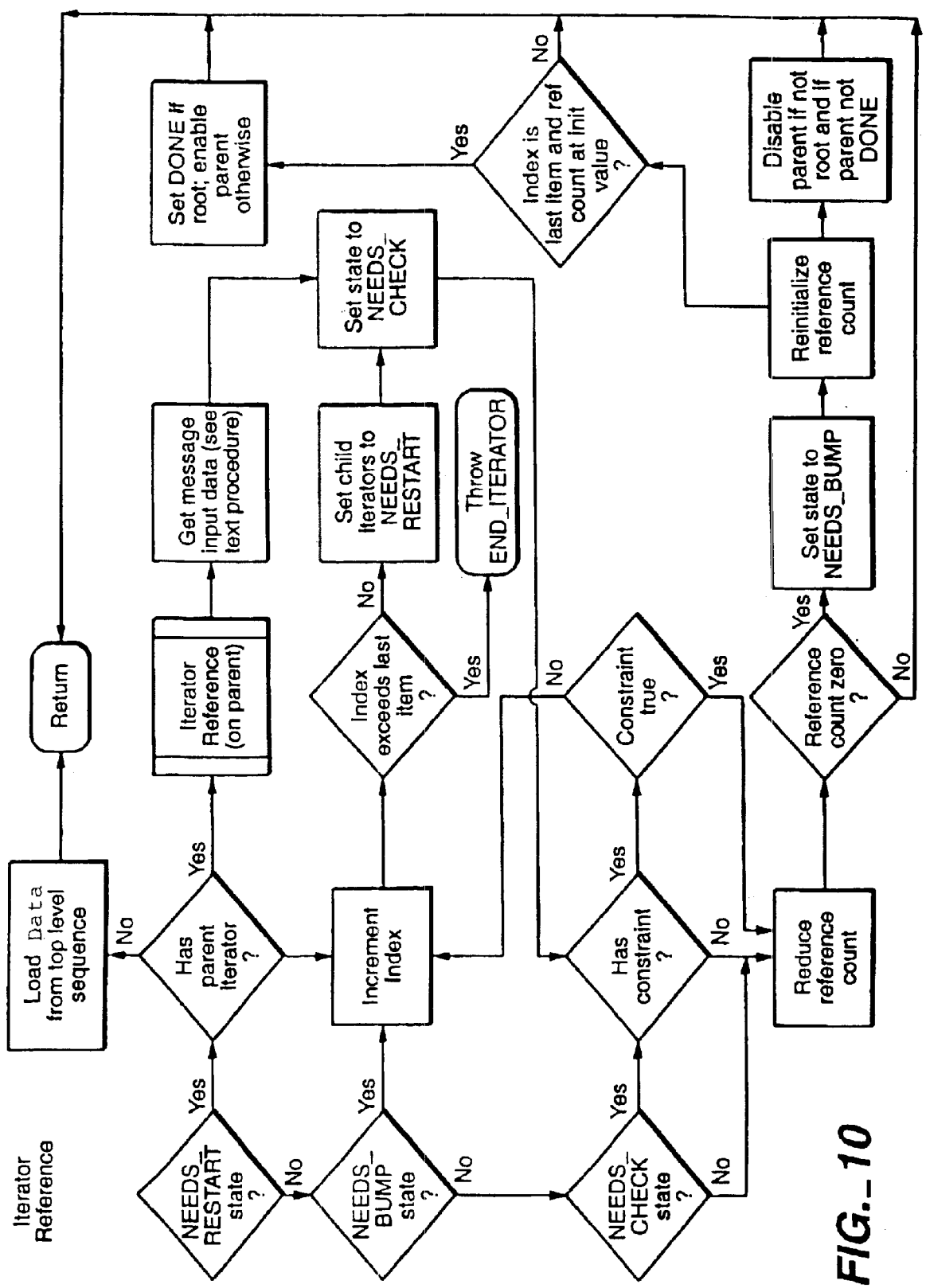
FIG._10

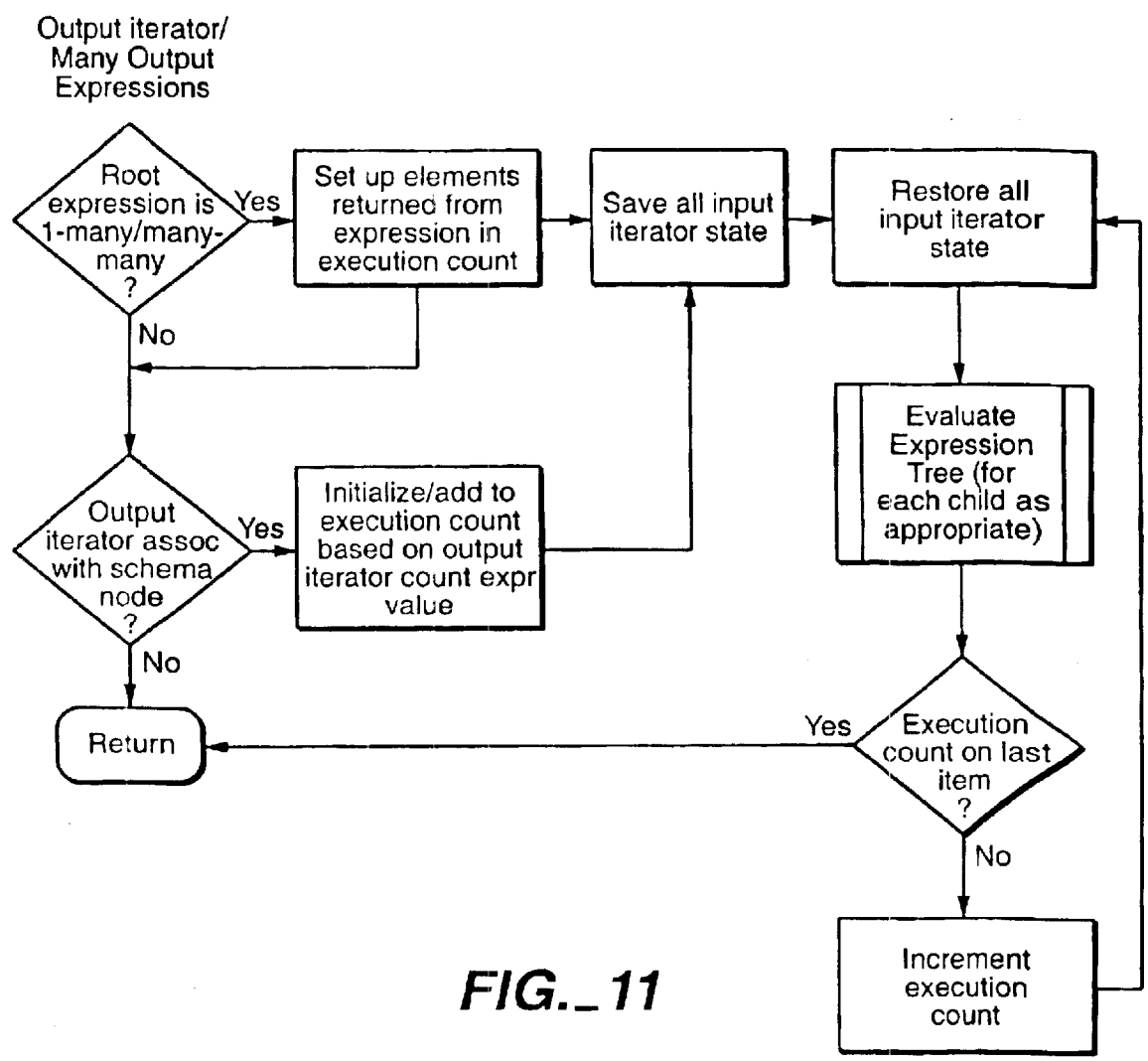
FIG._11

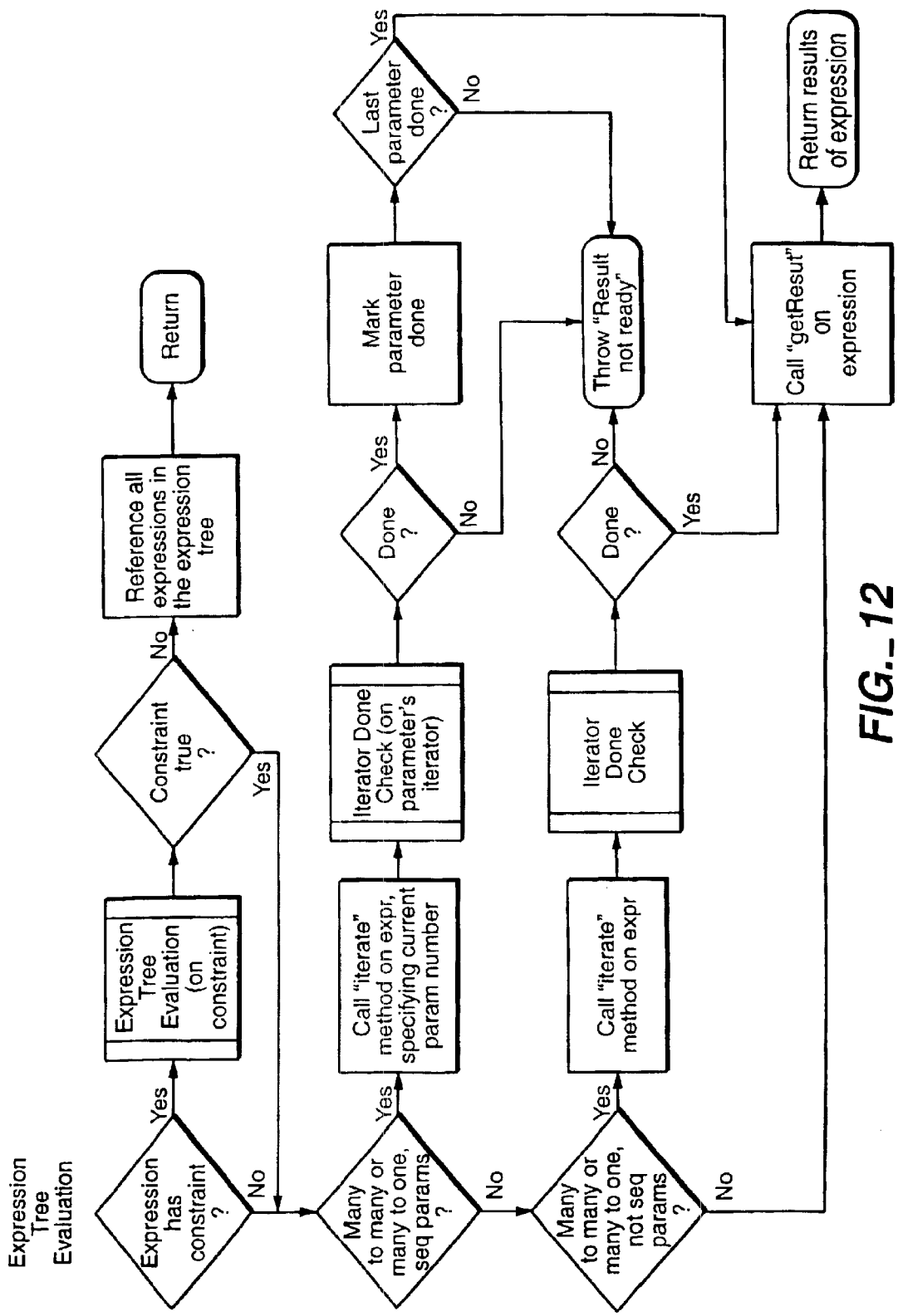
FIG._12

METHOD OF EXECUTING A DATA TRANSFORMATION SPECIFICATION

FIELD OF THE INVENTION

This invention relates to computer systems and, more particularly, to information processing systems that transform data from one form to another.

HISTORY OF THE PRIOR ART

Computer applications often need to use data prepared by different computer applications. For example, when a bill is paid by a company using a first accounts payable application, some of the information associated with that bill needs to be forwarded to a second general ledger application, to be recorded for the company's financial statements. It is possible that the first and second applications were provided by two different companies and that the exact format and content of the data representing the bill differ. For example, the first application may represent an account number as two data items: a department code of three characters and an account of up to four digits; while the second application represents an account number as a single data item of up to ten digits. To allow the account data from the first application to be used by the second application, the department code and account data items from the first application can be concatenated into the single ten digit account number data item when the data associated with the bill is forwarded to the second application.

However, if the data from the first application is transferred to a third application requiring yet another format for an account number, this solution may not work. To obviate this problem, instead of modifying the first application, the billing data from the first application may be intercepted and modified by an "interceptor" computer program not associated with either the first or second application. In this way, neither application need be modified; and, if either the first or the second application changes, only the interceptor program must change.

Large companies can have thousands of computer applications that must communicate data with each other. Because an interceptor program must be written for every pair of communicating applications, this could result in an unmanageable number of interceptor programs. To help alleviate this situation, general purpose software programs have been devised to transform data from one form to another. To further facilitate matters, standards have been created for various aspects of the representation of data.

Data that is exchanged between applications is broken into messages, each containing data items. In the above example, the data items associated with a bill (the amount, account number, date paid, vendor, and the like) collectively form a single message.

One can separate the content of a message into encoding and semantics. Encoding deals with the many issues associated with representing the data on the particular medium of exchange (which could be, for example, a punched card, magnetic disk, or a telephone wire). It also includes number and character representation, separation of the different data items in a single message, the mechanism for naming the data items, how characters are represented, and other issues necessary to convey the semantics of the message.

Nearly all aspects of message encoding are specified by means of standards. One of the most popular standards in this area is the Extensible Markup Language (XML) specification. This specification provides a method of encoding where data items can be named and structured into named groups.

Although data transformation software must deal with encoding issues, they are not important for this description and will not be discussed further. Only the semantic aspects of data transformation are considered.

The semantics are the meaning of the message. Semantics include the name of each of the data items, the order and structure in which the data items appear in the message, and the meaning of the values of each of the data items. The remainder of this description refers to a data item containing a single value as a "field." Fields in a message can be arranged in named groups called "containers." For example, a person's name can be represented as follows:

PersonName (container)
        FirstName (field)
        MiddleInitial (field)
        LastName (field)

In this example, referring to the data item "PersonName" is a reference to the entire name. When there are hundreds and maybe thousands of data items associated with a message, grouping is necessary to easily examine and manipulate parts of the message. Containers can hold fields and other containers. Fields or containers may be repeated either a fixed or variable number of times. Consider the case of a message representing a customer that includes a history of all of the orders that customer has placed. Typically, this is represented by a container that holds the information associated with each order; and that container repeats for a variable number of occurrences. When a field or container can repeat, this is called a "sequence."

The definition of the content of a message is called a "schema" and is represented using a "tree." A tree is a method of relating multiple entities that are called "nodes." Each node has a single parent and may have zero or more children. The top most node, that is, the one node without a parent is called the "root." If a node has both a parent and one or more children, is it called an "intermediate." Finally, a node with no children is a "leaf." An example of a tree is illustrated in FIG. 1. The root and intermediate nodes are containers (and possibly sequences), and the leaf nodes are fields.

For the purpose of a transformation definition, there is an input schema, which defines the input message and an output schema defining the output message. Here is an example of a simple schema:

Customer (container)
        Name (field)
        Address (field)
        Orders (container and sequence)
            PartNumber (field)
            Quantity (field)
            Price (field)

When referring to a field in the schema, the field name is normally qualified with its enclosing containers. In the above example, the PartNumber field would be referred to as Customer.Orders.PartNumber.

A transformation consists of the input and output schema and all of the rules that describe how to build the output message from the input message. Typically, a transformation processes a single input message producing a single output message. Transformations are capable, however, of processing one or more input messages producing one or more output messages.

There are several different types of transformations. One type is used for copying data from an input field with one name to an output field with a different name. A second type of transformation performs a function on an input field that alters it in some way and sets an output field to the result of that function. An example is converting a date from Jun. 23, 1998 to Jun. 23, 1998. A third type of transformation fabricates an output field either from multiple input fields or from a portion of a single input field. Fabricating may also include performing a function as mentioned above.

A fourth type of transformation creates a sequence of output fields based on a sequence of input fields. For example, in the message above containing a customer and the associated orders, the output message may contain a sequence of orders each of which corresponds to an order in the input message. Further, performing a filtering operation to exclude some of the orders from the output might be necessary. A filtering condition specifies the criteria for selection of input data before it is considered for further processing. An exemplary filtering operation might select all orders whose total amount was over one hundred dollars.

A fifth type of transformation alters the structure of the data. In the customer example above, suppose it was desired to have multiple messages produced from the single customer message, where there is one output message per order. Such an output message would have fields related to both the customer and the order. More complicated structural transformations which are sometimes required will be discussed below.

Typically, the details of the semantic structure of the messages associated with an application are best understood by those who use those applications on a daily basis. In general, such persons are not programmers. Current transformation software allows non-programmers to use a graphical user interface (GUI) to handle some of the simpler cases. For example, a single field may be copied from the input to the output using "drag and drop." Drag and drop is a standard GUI technique where a mouse is used to select a field, visually carry (drag) it to another field, and then release (drop) it there.

However, programming (rather than GUI) techniques have been required when more complex transformations must be implemented such as the fourth and fifth types of transformations specified above. For example, to generate such transformations requires a method of specifying what is to occur for each unique transformation. A transformation must indicate the characteristics of the input data, the characteristics of the output data, filtering conditions for selecting input data, and the steps necessary to create the output data based on the input data. For each field of output, a sequence of steps must be defined to create that field. Both the steps to create the output data and the filtering conditions on the input data are often specified using "expressions." Expressions are defined in some sort of text based programming language (usually proprietary) that requires knowledge of programming to use.

A "general expression tree" is a tree that connects one or more expressions. Each expression returns a single value and takes zero or more parameters. The general expression tree consists of a root expression whose returned value is the result of executing the tree. Each of the children of the root is another expression, whose return value is a parameters for the root. This process is repeated for as many expressions as desired.

A "tree view" is a method for displaying a set of related objects that can be represented as a tree. This view is standard in modern graphical user interfaces for presenting things like files which are enclosed in folders (which may be in other folders, and so on). Generally, a tree view has mechanisms to move nodes from one tree to another tree (or another part of the same tree). Examples of the tree view are the Microsoft Windows Explorer and modern email programs that provide a way to contain mail messages in folders. Graphical presentations of tree views have methods to "drag and drop" a node from one place to another. Although graphical presentations are the most prevalent at the present state of the art, textual forms may be used to describe a tree view; and manipulation of those forms may be accomplished by cut, copy, and paste (or similar) techniques that provide ease of use and simplicity for the non-programmer.

As will be understood, the concepts for creating many transformations are quite complex. The creation of transformations is, consequently, a process that would be much easier if it could be handled entirely through a graphical interface or some other easily understandable interface.

The definition of the content of a message is called a "schema" and is represented using a "tree." A tree is a method of relating multiple entities that are called "nodes." Each node has a single parent and may have zero or more children. The top most node, that is, the one node without a parent is called the "root." If a node has both a parent and one or more children, it is called an "intermediate." Finally, a node with no children is a "leaf." An example of a tree is illustrated in FIG. 1. Also, FIG. 2 illustrates the same tree in a form more suitable for use by a graphical user interface. The root and intermediate nodes are containers (and possibly sequences), and the leaf nodes are fields.

Object Query Language (OQL) is a specification that supports query (that is, finding data) and transformation of the results of the query. The transformation capabilities of OQL are quite powerful, allowing all of the types of transformations listed above. A complete transformation tool should be capable of any type of transformation that is expressible with OQL.

Extensible Stylesheet Language—Transformation (XSLT) is another relevant standard. This standard was originally developed as part of the XSL standard for creating HTML documents from XML documents. The transformation portions of the standard were generalized and separated into XSLT. XSLT is also powerful, although the level and amount of specification required to do more complex operations is more than that of OQL.

Because these standards are all text-based and require knowledge of programming techniques, it has been either impossible or cumbersome for the prior art to adapt them to a graphical interface usable by non-programmers. There are no transformation software tools that allow all of the desired capabilities completely within a graphical user interface (or some other interface that is easily understood and manipulated) such that a non-programmer can specify the transformations without having to write computer code of some sort. Because of the increasing need for data transformation, it is important that the people that have the best understanding of the semantics of the data, but lack special training in the art of programming, be able to perform complex transformations.

It is also important to provide a simplified programming environment by which transformations can more easily be created by those who are skilled at programming.

Although, as has been mentioned, the various processes described in this specification may be implemented by a programming utilizing any of a number of different programming languages, it is quite desirable that some of the more modern languages be utilized in order to obtain the full benefit of their advantages.

SUMMARY OF THE INVENTION

It is, therefore, an object of the present invention to provide a method for executing a transformation utilizing modern object oriented programming languages.

This and other objects are accomplished in the present invention by a computer-implemented process for transforming an input message to an output message including reading transformation configuration information, reading an input message, creating output message data corresponding to each output schema node, calculating a number of reasons to continue for each schema node, performing the steps until the number of reasons to continue becomes zero, and writing the output message.

These and other features of the invention will be better understood by reference to the detailed description which follows taken together with the drawings in which like elements are referred to by like designations throughout the several views.

BRIEF DESCRIPTION OF THE DRAWINGS

FIG. 1 is a diagram illustrating a tree in standard form.

FIG. 2 is a diagram illustrating a tree in a form more suitable for use by a graphical user interface.

FIG. 3 is a diagram representing an input schema and an output schema, an expression tree, and expression types utilized to generate transformations.

FIG. 4 is a diagram outline for implementing a process by which the steps necessary to produce an expression tree.

FIG. 5 is a flowchart of the process used to calculate the iterator assignment.

FIG. 6 is an example of a message representation of an input message as shown in FIG. 3.

FIG. 7 shows the relationship of input iterators to the message data.

FIG. 8 shows the relationship of schema nodes to the message data.

FIG. 9 is a flowchart of the main execution loop, the processing of an output schema node, and the iterator done check.

FIG. 10 is a flowchart of the iterator reference procedure.

FIG. 11 is a flowchart of the output iterator/many output expressions procedure.

FIG. 12 is a flowchart of the evaluate expression tree procedure.

DETAILED DESCRIPTION

In this detailed description, the operations will be described as carried out in a preferred graphical embodiment. Such an embodiment utilizes a graphical interface (GUI) and uses various well known techniques such as drag and drop developed to make manipulation of data and other elements easy for an unskilled user.

For example, a tree view is a common means of expressing hierarchical data in a graphical user interface. In the present invention, the tree view is used to express the input and output schemas, the possible function and constraint types, and the expression trees. The use of a tree view for the display of schemas and expression types graphically is known; however, the use of the tree view for the creation, display, and manipulation of expression trees is new.

Even though a graphical embodiment is described, it will be recognized by those skilled in the art that the underlying process may be implemented by other interfaces designed to make manipulation by a relatively unskilled user a simple and intuitive process. For example, textual forms may be used to describe a tree; and manipulation of those forms may be accomplished by copy and paste (or similar) techniques that provide ease of use and simplicity for the non-programmer. Whenever a technique is described for use in a graphical interface, the description is intended to encompass use in these other forms of interfaces and will be apparent to those skilled in the art.

Steps to Configure a Transformation

The following steps are taken to define a transformation which may utilize the iteration capabilities described herein.

A first step that the user takes in providing a transformation which may utilize the present invention is to select the input and output schemas that will be utilized. Typically, each application program that is to be a source or a recipient of data utilizes a known format (schema) for presenting that data in a message. From these, a database of those schemas that are expected to be utilized is prepared and provided. The database may index the schema by application program name and version. If a program provides a plurality of schema, further sub-categorization may be provided. From these, a listing may be provided to the user from which selection of input schema and output schema may be accomplished.

Selection of a particular application program or a sub-category under a program as input generates a tree representing an input schema. Selection of another application program or a sub-category under a program as output generates a tree representing an output schema. In one graphical embodiment which may utilize the present invention, these schema are displayed at the same time in a single window of a graphical user interface. FIG. 3 illustrates in the upper left two panels input and output schema of two representative applications displayed in the same window. Depending on the embodiment, display may be in individual windows appearing on one or more output displays.

As may be seen in FIG. 3, each of the input and output schema are represented in the tree view described above. Each tree begins at a root position that functions as a container. Below the root are arranged the various containers, sequences, and fields which represent the schema.

Once the input and output schema have been displayed in the graphical embodiment, an output field is selected to receive an expression tree that defines its content. In the figure, "name" is blackened to show that it has been selected.

For this selected output field, a transformation is then defined which defines the rules for building the particular output field from zero or more of the input fields. It is often true that many of the input fields require only to be copied to the output field and do not require further transformation. In this case, a simple drag from the input field to the output field forms an expression tree that copies the input to the output. An illustration is dragging "custId" from the input schema to the output schema in FIG. 3. Those fields that require transformations will be apparent from differences in the input and output schema provided and from the user's requirements for the output data. For example, the input field references "firstName" and "lastName" require a transformation to produce the "name" field of the output schema in FIG. 3.

When defining a transformation, the process for constructing each output field is defined. For each output field to be populated with data (it is permissible for an output field to be left empty), a set of rules to create that field is defined. These rules are built using "expressions." An expression is a set of computer code that takes as its input zero or more "parameters," manipulates those parameters in a manner specific to the type of the expression, and produces a single result. This result may be placed in an output field or may be a parameter to another expression. The parameters of an expression are other expressions. In order to define the rules for any particular transformation, an expression tree is constructed. Using this procedure, the following "expression tree" can be formed:

Root expression
    Expression A (1st parameter of root)
        Expression C (1st parameter of expression A)
    Expression B (2d parameter of root)

In the above example, the root expression has two parameters, expression A and B; and expression A has a single parameter that is expression C.

Each expression has a name that is used to identify that expression in the expression tree.

There are four categories of expressions for the purpose of this specification:

1) Field Reference—an expression that references a field from the input message. The value of the specified field is the result of the field reference. The name of the field reference is the fully qualified name of the input field. An example of a field reference is Customer.LastName that refers to the last name field of the customer container. A field reference is the only means of referencing data from the input message.

2) Function—an expression that returns a result, usually by manipulating its parameters. A function is an instance of some named function type that defines the behavior of the function. For example, a "concatenation" function returns the value of all of the parameters concatenated together. Another example is a "constant" function that takes no parameters and simply returns a constant value.

3) Formal Parameter—an expression that defines the existence of a named parameter for its parent function or constraint. The name of the formal parameter expression is the name of the parameter, which has its meaning relative to the parent function or constraint. For example a "subtract" function would have two formal parameters, one called "value," and the other called "subtrahend," where the subtrahend is subtracted from the value.

4) Constraint—an expression that returns only a true or false result based on the value of its parameters. Like a function, a constraint is an instance of some named constraint type that defines the behavior of the constraint. For example, an "equals" constraint takes two parameters and returns "true" if they are equal and "false" if they are not.

In a graphical embodiment, each of the categories of expressions is displayed in a window of the output display in a manner such as that illustrated in FIG. 3 of the drawing. In the GUI expression tree, each lo node is an expression and each node is identified with an icon showing the type of expression (function, constraint, formal parameter, or field reference), and a small amount of text describing the name of the expression and any relevant configuration information. The lower left hand panel of FIG. 3 illustrates an expression tree.

Although an expression tree may be represented or specified in either a plain text format or constructed using programmatic interfaces, in a graphical embodiment, various drag and drop operations are defined between the trees.

The techniques for defining these operations are well known to those skilled in the art of computer programming and will not be discussed further. It should be noted that many of these techniques have themselves been programmed to produce results by graphical manipulation. In one embodiment, the following graphical manipulations have been programmed using well known programming tools to produce the results described.

1) Dragging a field from the input schema to a field in the output schema produces an expression tree containing the field reference to the input field.

2) Dragging a container from the input to the output matches all of the enclosing fields in the input schema to the output schema by name, and has the same effect as if each of these fields was dragged as specified in item 1 above.

3) Dragging a function type to an output field creates an expression tree for that field which contains that expression type.

4) Dragging a constraint type to an input field creates the input constraint tree associated with that field's enclosing sequence.

5) Dragging an input field to an expression in the expression tree adds that input field as the last parameter of that expression.

6) Dragging an expression in the expression tree to another expression removes the dragged expression from its parent and adds the dragged expression as the last parameter to the expression that was dropped on.

7) Dragging a function or constraint type to an expression adds that function or constraint to the expression as the last parameter.

The expression tree is started by associating an initial function or field reference with an output field. In a graphical embodiment, this may be accomplished by dragging a copy of the function type or input field from its representation in a window of the display (such as that illustrated in FIG. 3) and dropping the copy on the output field selected from the output schema. If the initial expression is a function and it has parameters, additional functions and field references may be added for each of the parameters. Some functions (or constraints) may have a variable number of parameters, in which case any number of functions/field references may be added as parameters. Other functions/field references may have only certain parameters, where each parameter has a name; in this case, a formal parameter expression is automatically provided that identifies the required parameter's name.

Functions and constraints are defined as "expression types" which each has a globally unique name. For example, the function type named "/functions/common/concatenation" is the code necessary to concatenate multiple parameters. When this function type is added to a particular expression tree, it becomes a function that is also an expression. There is a simple application-programming interface that function/constraint types must implement. This allows new function/constraint types to be added by anyone skilled in the art of programming. The upper right hand side of FIG. 3 is an example of expression types.

Each function or constraint type may have configuration information associated with it. This configuration information is filled in when the function/constraint type becomes part of an expression tree. The "constant" function, which returns a constant value provides a simple example of configuration information. Its configuration information is the constant value. An example of this is shown on the lower right hand side of FIG. 3. Function/constraint types can be implemented as components using available component standards (for example, the JavaBeans specification from Sun Microsystems); in this case the type of configuration information required can be specified declaratively, according to the rules associated with the component specification in use.

A field reference is the simplest expression, taking no parameters and returning the value of the specified input field. If the value of the output field is to be set directly from the value of an input field, the expression tree associated with the output field contains only a single field reference, referring to the input field (e.g., Customer.Orders.PartNumber). Every output field expression tree that references data from the input message must do so through the use of one or more field references.

A more complex transformation for an output field may be defined using a function. A function can have parameters, each of which may be a function, field reference or formal parameter. For example, using the schemas defined in FIG. 3, an expression tree to form the output customer name from a concatenation of the last name, a comma, and the first name of the input name field, would have the following form:

Output field: CustomerOut.name
        Function: Concatenate
            FieldRef: Customer.lastName
            Function: Constant ","
            FieldRef: Customer.firstName In the above example, the root of the expression tree is the concatenate function, whose result is therefore used to populate the CustomerOut.name field.

The above expression tree may be generated in the manner described above for a graphical interface in the following manner. The function concatenate may be dragged from its display position and dropped on the selected field CustomerOut. name. In the graphical embodiment, this will begin an expression tree under the customer name output field with the single expression. Then, the field "lastName" may be dragged from the input schema and dropped on the concatenate function of the output "name" field. A constant function with a comma value is next dragged from the function types and dropped on the concatenate function. Finally, the field "firstName" is dragged from the input schema and dropped on the concatenate function of the output name field.

A function or constraint may support either a variable or fixed number of parameters. If the function or constraint supports a fixed number of parameters, each parameter is a formal parameter expression whose name is the name of the parameter. The children of the formal parameter(s) are the actual parameter expressions, either a field reference or a function. If the function or constraint supports a variable number of parameters, the actual parameters are direct children of the function or constraint; formal parameters are not used. Here is an example of the use of a formal parameter of a multiply function. The configuration information associated with the function defines the multiplier as being 0.08. The formal parameter is the multiplicand that is a field reference to the total amount field.

Output field: InvoiceOut.SalesTax
        Function: Multiply, by 0.08
            FormalParam: multiplicand
                FIeldRef: InvoiceIn.TotalAmount In this example, the function causes the input "Invoice. TotalAmount" to be multiplied by 0.08 to provide "Invoice-Out. SalesTax" in the output message.

Constraints are used to express conditional behavior. They can influence the execution of parts of the expression tree. In order to do this a constraint is associated with a function or field reference. Such a function or field reference is called a "constrained expression."

At most one constraint may be associated with the function or field reference. If the constraint returns true, the constrained expression behaves as if the constraint was not specified. If the constraint returns false, the constrained expression is said to return "no result". The handling of a "no result" return depends on the context. When "no result" is returned by a constrained expression that is a parameter of a formal parameter, the constrained expression is ignored; and the next parameter of the formal parameter is considered. If all of the parameters of a formal parameter return "no result", the formal parameter itself returns "no result".

If the constrained expression supports a variable number of parameters, only those that do not return "no result" are considered, the rest are ignored. The following example illustrates this point:

Function: Concatenation
    Function: Constant "I like"
    Function: Constant "dogs"
        Constraint: Equal "d"
            FormalParam: Source
                FieldRef: inputEvent.likeVal
    Function: Constant "cats"
        Constraint: Equal "c"
            FormalParam: Source
                FieldRef: inputEvent.likeVal Here the Constant "dogs" and the Constant "cats" are the functions that are subject to the "no result" should their associated constraint evaluate to false. This results in "I like dogs" if the value of inputEvent. likeVal is "d", and "I like cats" if inputEvent likeVal is "c", and "I like " if inputEvent likeVal is neither "d" nor "c".

If the root expression returns "no result" then a null value is written to the output field. In the example above, "I like " is produced without more if both of the following parameters return "no result." An expression may treat a "no result" return in any way that suits it; if an expression receives a "no result" from one of its parameters and does not explicitly handle it, the expression itself returns "no result." An example of an expression providing special handling for "no result" is the "skip on no result" expression which discards the current output element from the lowest level sequence.

Each input sequence may be associated with a set of constraints that are used to control (filter) which elements of the sequence are to be considered for the output. For the purpose of the remainder of this description, we treat a message as a sequence. There are three categories of constraints any or all of which may be associated with each sequence.

1) The element of the sequence is dropped; if the sequence is the message, the message is dropped.
2) The entire message is dropped.
3) The entire message is treated as an error and sent to a separate error processing system.

If no constraints are specified or the constraint returns true, nothing is done; and the message or sequence element is accepted for further processing.

Since the above mentioned constraints are expressions, these are also the root of expression trees, i.e. each constraint takes parameters which can be other constraints, functions, or field references. With the use of simple constraints like "and" which returns the intersection of all of its parameters, and "or" which returns the union of all of its parameters, arbitrary expressions can be used for sequence filtering.

Here is an example is of an input constraint that accepts messages only for customers whose province field has the value of "PA".

Message input constraint
Constraint: Equals "PA"
FieldRef: Customer.address.province The described process for creating a transformation lends itself well to a programming environment which greatly simplifies the tasks by which a person adept at programming may generate expression trees. FIG. 4 provides the outline for implementing a process by which the steps necessary to produce the expression tree are defined, regardless of which type of interface is used. By following each of the combinations of these steps, one can produce all of the legal expression trees and never produce an invalid one. This is a method of specifying the results associated with the expression tree precisely and unambiguously.

Having selected a field of the output schema which is to be produced, a programmer moves to the root box of the outline shown in FIG. 4. In the root box, the programmer chooses one of the possible operations. The possible operations which may be accomplished from the root box are given as "function" or "field reference." Thus, the programmer chooses one of these to replace the root box. The choice depends on what is to be accomplished for that field. In the example described above in which first and last names from the input schema are concatenated to provide an output name field, the operation to be performed to generate the output field is the function type "concatenate." Consequently, the programmer goes to the box "function" and replaces the "<name of function>" with "concatenate," one of the function types provided.

The programmer then proceeds to the possible choices which follow in the function box; these are "constraint" and a plurality of "parameters." There are no constraints in the concatenation operation; however, there are three parameters involved in the particular concatenation operation. Consequently, the programmer proceeds to the "parameter" box which provides "function," "formal parameter," and "field reference" as choices. In this case, the parameter is the field reference "firstName" from the input schema. The programmer proceeds to the "field reference" box and replaces the "<name of field reference>" with "firstName." There are no constraints for the field reference, so this parameter is complete.

The programmer then returns to the function box to complete the remaining "parameters" for the concatenation function. The programmer again proceeds to the parameter box where "function" is chosen because the next parameter is the "constant" function type. This leads to the function box where the name of the function is replaced by "constant" and a comma "," is specified as a configuration property of this function. This completes the second parameter of the function.

The programmer returns to the function box to complete the last "parameter." This leads to the parameter box and then to the field reference box where the "<name of field reference>" is replaced by "lastName." This completes the programming necessary for generating an expression tree in accordance with the described process. Those skilled in the programming art will recognize that this process will provide an expression tree which accurately represents the desired result in an easy and understandable manner. More importantly, this simple programming interface eliminates the chance of error so prevalent in programming.

General Discussion on Iteration

The specification defines a process for configuring a transformation specification dealing with sequences. This process consists of several rules as described below. It is possible by those skilled in the art of programming to implement this process given an understanding of the rules presented below.

In the current art, the way one specifies how many times an output sequence iterates (i.e., how many elements are in the output sequence) is to write a computer program to specify the loop. An example of such a specification is:

```
int i=0;
while (i <inputsequence.length) {
    outputSequence[i].field1=inputSequence[i].field1;
    i=i+1;
}
```

In this loop by which values of field1 of an output sequence are determined from values of field1 of an input sequence, an integer value is first set equal to 0. Then, a test is conducted for each iteration of the loop to determine that the particular iteration is less than the number of items in the sequence and the first output field 1 of the output sequence is set equal to the value of the first input field1 of the input sequence. Finally, the number of the loop iteration is incremented; and the loop is restarted.

In addition to requiring programming skills, the above type of specification is not the most efficient method for specifying the contents of an output sequence.

In the majority of cases, such as that illustrated by the code fragment described above in which an output sequence is to be generated from values in an input sequence, there is a correspondence between the number of elements in the input sequence and the number of elements in the output sequence. For example, both the input and output messages may contain a sequence of the customer's orders (i.e., some number of the customer's orders). When a field is copied from the order sequence in the input message to the order sequence in the output message, it is possible to automatically calculate the number of elements in the output sequence. Each of the customer's orders in the output message can be constructed from the fields contained in an order from the input message so that the output message has the same number of orders as the input message.

The process uses this correspondence to calculate which elements are to be present in an output sequence. This relieves the user of having to explicitly specify the iteration in the manner illustrated by the coded example shown above.

Using this technique, a simple copy of an input field to an output field can give the transformer all of the information it needs to calculate the desired iteration of the output sequence without any further specification by the user. By providing additional information about the desired iteration characteristics in a declarative fashion (as opposed to writing code), the process can handle complex iteration cases and is as expressive as the OQL standard in terms of its transformation capability.

In cases where there are many input and output sequences and fields must be copied between them, the process provides the correct number and order of elements in the output sequences without the user making any explicit specification of iteration. Should the user desire to do more than copy data from an input sequence to an output sequence, advanced features of this process can be used explicitly.

"Iterators" are associated with sequences. An iterator is used to determine how each element of a sequence is processed (e.g., in a sequence of orders, how many orders are processed). This information is then used to determine how output sequences should iterate, or how many times certain functions and constraints should be executed. The iterator can be thought of as a declarative way of specifying a loop. For example, an iterator may be specified which processes each member of the sequence in the order that is present in the sequence. This is the default specification of an iterator in the process.

An iterator may have other properties that define how an input sequence is to be processed. These properties include, but are not limited to sorting, uniqueness, and the lockstep property which is described below. The selection of these properties is done by the user of the process using standard graphical or other techniques to select characteristics. For example, in the preferred graphical embodiment of the process, a configuration panel may be presented allowing the user to select the desired characteristics (e.g. which field to sort on, should the iterator be unique).

An iterator sorts by specifying the order in which the input elements are processed. For example, an iterator may specify that the items associated with a customer's order be processed with the highest priced items first.

Sometimes sequences contain multiple elements which are either completely identical (that is, all fields within the element have the same value), or where some fields have the same value. An iterator property may specify that only unique items be processed (that is, the second and subsequent copy of identical items are ignored). Another iterator property may specify that only one element for each unique value of a given field should be processed. For example, it may be desirable to process only one item for each distinct part number of a customer's order.

Each iterator has a name that is unique within the transformation specification. Iterators are shown for the remainder of this description as "@iteratorName" in order to distinguish the name of an iterator from a field, container or sequence.

There are two types of iterators, input iterators and output iterators. Each input sequence is associated with one or more input "iterators." Each output sequence may be associated with at most one output iterator. An input iterator describes the iteration of a sequence in the input message. The input iterator is normally used to specify how many times an output sequence needs to iterate. For example, if the input message has a sequence representing the orders for a given customer, the output message can have a similar sequence with an element for each order. The input iterator associated with the orders sequence is used to specify this, as described below.

There are some (relatively rare) cases where a sequence in the output message needs to iterate more frequently than some sequence in the input message. For these cases, an output iterator is necessary. The frequency of iteration of an output iterator is specified by an expression that returns an integer value, specifying how many times the output iterator will iterate.

An example of this is a case where a single input field contains multiple values and it is desired to have each value be copied to an output field which is contained in a sequence. For example, suppose there is a "name" input field which is expected to contain a value of the last name, a comma and then the first name, for example "Lyman, Gerald." The desired output is a sequence of name/value pairs like this:
 NameValues (container and sequence)
  fieldName (field)
  fieldValue (field)

The first element of the output sequence should have a FieldName of "LastName", and a FieldValue of "Lyman." The second element has a FieldName of "FirstName" and a FieldValue of "Gerald." To accomplish this, an output iterator is associated with the NameValues sequence, and the expression providing the count of the number of iterations is a constant function returning the value two.

Most of the discussion in this specification is related to input iterators, thus henceforth the unqualified use of the term iterator will mean an input iterator.

Input Iterators

By default a single input iterator known as the "default iterator" is associated with each sequence and given the name of the sequence. Additional iterators may be added as desired.

Except for the iterator associated with the message, each iterator has a single parent iterator. The parent of the default iterator is the iterator associated with its enclosing sequence. A few examples are shown to illustrate how iterators work. Consider a schema containing the following sequences:
 Customer (container and sequence)
  custId (field)
  name (field)
  Orders (container and sequence)
   orderNumber (field)
   shipDate (field)
   Items (container and sequence)
    itemNumber (field)
    partNumber (field)

By default iterators are associated with each input sequence (note that iterators are associated only with the input sequences and not the fields), as shown:
 Customer (@Customer)
  Orders (@Orders)
   Items (@Items)

Consider a single Customer message that contains three orders (a sequence of orders) and in which each order contains four items (a sequence of items). The iterator @Customer has no parent; the parent of the iterator @Orders is @Customer; and the parent of @Items is @Orders. For a single customer message, the iterator @Customer will iterate once since only a single customer is involved. For this single customer message, the iterator @Orders will iterate three times (once for each order) within its parent @Customer since this customer has placed three orders. For this single customer message, the iterator @Items will iterate twelve times, one time for each of the four items associated with each of the three iterations of its parent @Orders. Thus, the number of times each iterator iterates depends on the number of times its parent iterator iterates.

A tree of the iterators can be formed by relating each iterator to its parent. The tree of iterators in this example exactly corresponds to the sequences and shows the iterator for each node with its sequence following in parentheses:
 @Customer (Customer)
  @Orders (Orders)
   @Items (Items)

In the above examples, the output sequences have elements corresponding to the input sequences that are always in the same order as is specified as in the input sequences. Suppose it is desired to provide an output message for each item, and within that message a sequence that contains all orders with the same customer number as that of the customer. The output message schema would look like this:
 Item (container)
  Orders (sequence and container)
   custId (field)
   orderId (field)
   shipDate (field)

However, to accomplish the desired result, each order must be examined in the scope of a particular item. This requires an additional iterator to be added to specify each order for each item. Thus, a new iterator. @OrdersItems associated with the Orders sequence is added as a child to the @Items iterator. The iterator tree then looks like this:

@Customer (Customer)
       @Orders (Orders)
          @Items (Items)
             @OrdersItems (Orders)

This schema requires that for every item the process iterate through all of the orders. In order to do this, the operation iterates through any sequences that are between the message and Orders (in this case there is only one, the message itself). Considering the message data discussed above, the iterator @Items iterates twelve times. The iterator @OrdersItems iterates once for each order within each of the Items. This results in a series of twelve (Items) times three (Orders) equals thirty-six individual operations.

Iteration of Output Message Sequences Using Input Iterators

Having presented the behavior of iterators against input sequences, their relation to the output sequences can be described. A single input iterator is associated with each field reference. This iterator is associated with the enclosing sequence of the field. Since, for the purpose of this discussion, the message is also a sequence, even a field reference with a top level field of a message references an iterator, the iterator associated with the message. As discussed above, a field name can be specified with full qualification, for example:

Customer.Orders.orderNumber

In one graphical embodiment, when the iterator associated with a field reference is a default iterator, the field name is expressed with no reference to the iterator, as is shown in the example above. In the same graphical embodiment, if the iterator is not a default iterator, it is shown after its sequence. For example:

Customer.Orders(@OrderItems).orderNumber

In one graphical embodiment, when a field reference is selected and there are multiple input iterators associated with the enclosing sequence of the field, the interactive interface asks the user to specify the desired input iterator. If there is only the single default iterator, that iterator is automatically assumed.

As presented above, in an expression tree every field reference is ultimately associated with a single output field. This association may be direct in the case where the field reference is the root expression of the expression tree for the output field, or the association may be indirect because the field reference is a parameter to some function that is in the expression tree for the output field.

Every output field has an enclosing sequence (recalling that the message is treated as a sequence). Therefore, how the enclosing output sequence iterates can be determined by examining the field references contained in the expression trees associated with the output fields contained in the output sequence. Following is a simple example of this, using the above message as both the input and the output:

Output field: CustomerOut.Orders.orderNumber—@Orders
       FieldRef: CustomerIn.Orders.orderNumber In this example, an iterator is shown after the name of the output field. This iterator is used to determine how many times the enclosing output sequence of the OrderNumber field (i.e., CustomerOut.Orders) iterates. The effect is to generate an element in the enclosing output sequence for the field OrderNumber for each iteration of the input sequence CustomerIn.Orders. This result occurs because the iterator associated with the field reference is @Orders (which is the default iterator for Orders, the enclosing input sequence of OrderNumber).

To produce for each order an output which gives the CustomerName, the OrderNumber, the Items ordered, each with its ItemNumber and PartNumber, start with the following message:

Order (container and sequence)
       customerName (field)
       orderNumber (field)
       Items (container and sequence)
          itemNumber (field)
          partNumber (field)

Using the Customer message defined above in FIG. 3 as the input, a field reference is first added to associate the customer's name with each output order message.

Output field: Order.customerName—@Customer
       FieldRef: Customer.name

Note that the iterator associated with the enclosing output sequence (which is the Order message) is @Customer. This is because the rule associating the iterator from the field reference to the enclosing output sequence was followed. If this transformation were executed, it would produce one output Order message for each input Customer message.

Next, the OrderNumber field reference is added to the OrderNumber output field. At this point, an interactive interface could ask the user if it desired to change the way Order iterated from @Customer to @Order. If the user approved, the two field references would look like this:

Output field: Order.customerName—@Orders
       FieldRef: Customer.name
    Output field: Order.orderNumber—@Orders
       FieldRef: Customer.Orders.orderNumber

Iterator Compatibility

Knowing how to relate the iteration of output sequences with the iteration of input sequences allows consideration of how multiple input iterators can be used together in producing output sequences. To illustrate the problems in this area, the following example is used:

Input:
    Customer (container and sequence)
       custId (field)
       name (field)
       SalesReps (container and sequence)
          repNumber (field)
          territoryNumber (field)
       Orders (container and sequence)
          corderNumber (field)
          shipDate (field)
          Items (container and sequence)
             itemNumber (field)
             partNumber (field)

Output:
    CustomerOut (container and sequence)
       Orders (container and sequence)
          orderNumber (field)
          shipDate (field)
          shipTo (field)
          salesRep field)
          Items (container and sequence)
             itemNumber (field)
             partNumber (field)

This example has the following default iterator tree (built as specified above):

Customer (@Customer)
  SalesReps (@SalesReps)
  Orders (@Orders)
    Items (@Items)

Suppose the following expression trees were defined:

Output field: CustomerOut.Orders.salesRep
  FieldRef: Customer.SalesReps.repNumber
Output field: CustomerOut.Orders.orderNumber
  FieldRef: Customer.Orders.orderNumber This would cause a conflict in determining how the output sequence CustomerOut.Orders iterates. This is because one of the field references refers to the @Orders iterator and the other refers to @SalesReps. Since these iterators have no relationship, it cannot be determined how to iterate the output sequence CustomerOut.Orders. The above specification of the expressions trees is therefore not legal.

Consider these expression trees:

Output field: CustomerOut.Orders.orderNumber
  FieldRef: Customer.Orders.orderNumber
Output field: CustomerOut.Orders.Items.itemNumber
  FieldRef: Customer.Orders.Items.itemNumber With the above field references it can be determined that the Orders output sequence iterates using @Orders, and the Items output sequence iterates using the iterator @Items. Further, that each element of the Items output sequence, is part of the element of its corresponding order. So it is clear and unambiguous that the correct items are associated with the correct orders. This is known because the @Orders iterator is a parent of the @Items iterator in the iterator tree (which was determined because the Orders input sequence contains the Items input sequence). These expression trees are therefore legal.

In order to define legal selection of iterators, rules are defined to determine if iterators are compatible. Only compatible iterators can be used for field references in the same output sequence (whether such field references are directly associated with fields in the same output sequence, or the field references are contained in expression trees of fields in the same output sequence).

It is permissible to have multiple field references associated with the same enclosing output sequence and having different iterators, so long as those iterators are related in an ancestor/descendent relationship within the iterator tree. Iterators with such a relationship will be called "compatible". If the iterators are compatible, the output sequence iterates according to the lowest level iterator. If the iterators do not have such a relationship, an error is given at configuration time.

Except for certain cases described below, all field references in the expression trees associated with the output fields for a given sequence must consist of compatible iterators.

Lockstep Iteration

Suppose there are two input sequences at the same level that contain related data that need to be combined into a single output sequence. Since the sequences are at the same level, it is not possible to automatically determine a relationship between the two sequences. A single output sequence cannot be determined because it is not known which of the input sequences should be picked to determine how the output iterates. If the sequences are in fact related, the user can declare that one sequence is in "lockstep" with another. With this information, fields from either sequence can be used to form a single output sequence, because the iterators associated with both of the sequences are kept in lock step with each other.

Consider for example the following:

Customer (container and sequence)
  Orders1 (container and sequence)
    OrderNumber (field)
  Orders2 (container and sequence)
    ShipDate (field)

In this case, a single orders sequence is to be output that contains the OrderNumber and its associated ShipDate. To do this, both sequences must be traversed at the same time such that when the ShipDate is referenced from Orders2 it is from the same element number as the element in Orders1 containing the OrderNumber.

As discussed above, electing lockstep for an iterator is a property of the iterator and is done using the normal method for iterator property configuration, similar to that which configures the sorting and uniqueness properties.

Iterators and the Expression Tree

In the sections above the relationship between the input sequences and output sequences was discussed. This included how an iterator was associated with an output sequence, and the notion of iterator compatibility between iterators associated with different fields in the output sequence. In this section, issues associated with iterator compatibility are discussed within the expression tree.

Expression trees can do a number of basic things with respect to iteration.

An expression tree can process data so that the output occurs at the same rate as the input as shown in the concatenation expression tree described above. In such cases, all of the expressions in the tree iterate at the same rate and therefore must refer only to field references with compatible iterators. This is referred to below as one-to-one.

An expression tree can aggregate data that occurs more often (at a higher frequency) into a single data item. This is used, for example, to add the values of the unit cost field for all of the items in an order to determine the single total cost of the entire order. Here the unit cost field iterates at a faster rate than the output total cost field. This is referred to below as many-to-one.

An expression tree can produce multiple elements from a single input field. For example, suppose the input field contains multiple values separated by commas, and an output element is desired for each, as shown below:

Input:
  Inventor (container)
    Data (field)
Output:
  InventorOut (container and sequence)
    Value (field)

Data contains: "Edison, Thomas, 123 Main St". The desired output is:

Element 1—value: "Edison"
Element 2—value: "Thomas"
Element 3—value: "123 Main St."

This is referred to below as one-to-many.

Functions and constraint types have properties which can be selected that determine their behavior with respect to iteration.

A one-to-one expression is an expression where all of the parameters iterate using the compatible iterators, and the result of the expression iterates at the same rate as the lowest iterator in the parameters of the expression. All of the functions and constraints types described so far have been one-to-one.

A many-to-one expression is an expression where the parameters iterate more frequently than the result of the expression. Unless the sequential property described below is specified, all of the parameters must be compatible iterators and they must all iterate at the same rate. However the result of the expression iterates at a rate corresponding to some ancestor iterator of the iterators associated with the parameters. This type of expression is used for aggregation, for example to compute the sum of sequence of numbers. Here is an example of a expression tree that uses a many-to-one function which calculates the sum of the cost of each item:

Input:
    Order (container and sequence)
        OrderNumber (field)
        Items (container and sequence)
            ItemNumber (field)
            Cost (field)

Output:
    Order (container and sequence)
        OrderNumber (field)
        Items (container and sequence)
            ItemNumber (field)
            Cost (field)
        TotalCost (field)
    Output field: Order.TotalCost—@Order
        Function: sum (many-to-one)
            FieldRef: Order.Items.Cost A one-to-many expression is an expression where the result iterates more frequently than the input parameters. The input parameters iterate according to the rules for a one-to-one expression. In this case, the rate of iteration associated with the result is more frequent than the input iterator, and is further not related to the rate of any input iterator. An implicit iterator is defined that describes this output iteration. For the purpose of determining iteration compatibility, this implicit iterator is assumed to exist representing the iteration rate of the expression, and that implicit iterator is not compatible with any other iterator. An example of this type of function is a tokenizer, which produces an element in a sequence for each token found in a string. Here is a example of an expression tree using a one-to-many function used in the above inventor example.

Output:
    Output Field: InventorOut.Value
        Function: Tokenize, token "," (one-to-many)
            FieldRef: Inventor.data A many-to-many expression tree combines the one-to-many and many-to-one properties.

A sequential property is used only for the many-to-one or many-to-many expressions. This property specifies that all of the iterations associated with each parameter are to occur before considering the next parameter. This is the only case where the iteration of the parameters of a function may be described by multiple iterators. If the sequential property is not specified, all of the parameters are handled "in-step" since they are iterating at the same rate. An example of the need for the sequential property is a sum function that can calculate the sum of many different sequences, each iterating in an unrelated manner.

Each function/constraint type may be associated with only one of the one-to-one, one-to-many, many-to-one, and many-to-many properties discussed above. The sequential property can be used only when one-to-many and many-to-many properties are specified.

The above rules define how expressions can be related in an expression tree. Further, as specified above, each field in an output sequence that has an expression tree must have a compatible iterator as the result iterator of the root of the expression tree.

Procedure for Calculating Iterator Assignment

This section describes the procedures for adding expressions that refer to iterators. It has been shown above how iterators are associated with field references. At the time a field reference is added to an expression tree the other expressions in the tree need to be checked for iterator compatibility. In addition, all of the field references within the output sequence containing the expression tree need to be checked. During this checking process, both expressions and schema nodes are associated with an iterator which describes how often they are to execute.

In order to facilitate the process of validity checking of iterators it is useful to define the concept of an "iteratable object." An iteratable object is simply another name for both schema nodes and expressions.

Therefore, a schema node is an iteratable object and an expression is an iteratable object. Since both schema nodes and expressions are arranged into trees, and the expression tree is associated with an output schema node, we can refer to a tree of iteratable objects as the entire tree formed under a given schema node (containing both any descendent schema nodes and expression trees associated with those schema nodes).

Iteratable objects have one or more of the following properties:

1) Many input parameters—The iteratable object and its parameters iterate more frequently than the result of the iteratable object. For expressions, this corresponds exactly to the many-to-one and many-to-many iteration properties of expressions as defined above. For schema nodes, if the schema node is a container and a sequence it has this property, otherwise it does not.
2) Sequential parameters—This corresponds exactly to the sequential parameters iteration property of expressions as defined above. This property is never specified if the iteratable object is a schema node.
3) Many output parameters—This corresponds exactly to the one-to-many and many-to-many iteration property of expressions as defined above. This property is never specified if the iteratable object is a schema node.

Any iteratable object can be associated with a single input iterator which tells the execution engine how frequently that object is to execute.

When adding an iteratable object as a child of another iteratable object (in this case, the child object is always an expression, but the parent object might either be an expression or schema node), the following conditions are possible. A flowchart corresponding to these conditions and steps is shown as FIG. 5.

1) There is no iterator associated with the parent iteratable object, and there is no iterator associated with the child iteratable object. In this case, nothing is done and this procedure terminates. This can happen for example when a "constant" function is added to a schema node associated with a field when the iterator for the (field) schema node has not yet been determined.
2) There is no iterator associated with the parent iteratable object, and there is an iterator associated with the child iteratable object. If the parent iteratable object has many input parameters, and does not have the sequential parameters property, continue execution at step 1. If the parent iteratable object does not have many input parameters, and if the child iteratable object does not have many input parameters, continue execution by updating the parent iteratable object from the child. Otherwise, set the parent's iterator to the iterator associated with the nearest ancestor to the parent iteratable object. If there is no iterator associated with this first ancestor iteratable object, associate the root iterator (that is the iterator associated with the root input schema node) with the parent and all of its ancestor iteratable objects. This procedure terminates here.

3) There is an iterator associated with the parent iteratable object, and no iterator associated with the child iteratable object. If the child iteratable object has many input parameters, this procedure terminates here. Otherwise, set the child iterator to that of the parent, and set all of the descendent iteratable objects of the child iteratable to the iterator associated with the parent, stopping when a descendent with many input parameters is reached. This procedure terminates here.

4) There is an iterator associated with both the parent and child iteratable objects. Determine if the iterators are compatible according to the compatibility rules. If the iterator is not compatible, give an error to the user and terminate this procedure. If the iterator associated with the child iterable object is compatible with the parent iterator, determine if the child iterator is a descendant of the iterator associated with the parent iteratable object. If the child iterator is a descendant of the parent iterator, determine if the parent iterable object has many input parameters, then, if the parent iterable object has many input parameters the procedure terminates. If the parent iterable object does not have many input parameters, continue with the process at step 2. If the iterator associated with the child iterable object is an ancestor of the iterator associated with the parent iteratable object, change the iterator of the child to be that of the parent, and terminate this procedure. If the iterator associated with the child iterable object is not an ancestor of the parent iterator, terminate the procedure.

5) If the parent iteratable does not have many input parameters, ask the user if they intend to change the iterator for the output sequence, and if they do, change the parent iterator to be the child iterator, and terminate the procedure. If the user does not want to change the parent iteratable, terminate the procedure. If the parent iteratable has many input parameters, terminate the procedure without changing any iterators.

6) Update the parent iteratable object with the iterator associated with the child iteratable object. Continue updating all of its ancestors, up to, but not including the ancestor object with many input parameters. This procedure terminates here.

Iterators and Input Constraints

As discussed above, each input sequence may be associated with a constraint that acts as a filter for that sequence. Using the process, such a constraint may also be associated with an input iterator.

Rules for Output Sequence Iteration

An output sequence is always associated with an input iterator. As described above, this iterator is the lowest level iterator of all of the result iterators associated with the root expression for each of the fields in the sequence.

An output sequence may be associated with an output iterator. In this case, the output sequence iterates once for each iteration of its input iterator, and within each of those iterations, once for each iteration of the output iterator.

Executing a Transformation

The present invention specifies the steps to execute transformations specified using the methods described above. objects used in the execution of the transformation are described. Note that these are concrete representations of the types of objects specified above to configure the transformation.

The remainder of the description is the steps required to execute the transformation. These steps are broken into sections; each providing a specific part of the processing in order for the description to be easily understood.

Objects—Background

An object is an entity that combines state (data) with sections of computer code called methods. These methods perform functions on the object that may alter the object's state. One method can invoke another method, which accepts parameters and returns a result in the same manner as a mathematical function. The invocation of a method may have the side effect of altering the state of the object.

The state of the object can contain any number of data items. These may be either primitive data items like numbers or strings of characters or references to other objects. A reference to another object is called a "pointer" to that object. Either primitive data items or pointers may also be arranged in sequences.

Exception Handling

During a method invocation on an object, it may be desired to immediately terminate the method invocation without completing all of its instructions in order to signal an exceptional condition to its invoker. This is done by "throwing" an exception. The exception itself is an object that carries information about the meaning of the exception. The invoker of the method can arrange special code before invoking the method to "catch" the exception and perform special processing based on it.

This technique can be used through multiple levels of method invocation. If a first method provides the special code necessary to catch an exception, then it invokes a second method, which in turn invokes a third method. If this third method throws an exception, the second method is also not completed and the exception is caught by the exception catching code in the first method.

Transformer Objects

One or more objects represent each of the major elements of the configuration of a transformation. These objects are created and updated when the transformation is specified, and used when the transformation is executed. These objects represent and correspond to the portions of the transformation configuration described above.

A transformation consists of the following objects:
1) Transformation—a single object that represents the transformation as a whole.
2) Schema node—representing a field or container that is part of a schema. There is a tree of schema nodes for the schema associated with the input message, and another for the output message. Each output schema node refers to an input iterator that controls its iteration. It may refer also to an output iterator that provides additional iteration.

3) Expression—which can be one of the following:
  Field reference—as specified above each field reference points to an iterator.
  Formal parameter
  Function
  Constraint
4) Iterator—one for each input or output iterator. Although both input and output iterators are represented by the same type of object, it must be emphasized that the behavior of an input iterator is substantially different than that of an output iterator. When the term iterator is used unqualified, it refers to the type of iterator currently being discussed.

Input Iterator Object

The input iterator objects are arranged in a tree. The input iterator objects point to the data of the input message. All such data is accessed by means of an iterator object (the actual representation of the message data, and the details of the means of its access are described below). Before the data associated with an iterator is accessed, the "reference" method on the iterator object is called. This takes an action based on the current state of the iterator, sets up the iterator to provide the appropriate data, and sets the state of the iterator to reflect its new status. Immediately after the iterator has been referenced, the data required by a single field reference that is associated with the referenced iterator will be available and may be accessed by the field reference.

To initialize an input iterator the processing, the reference count of the iterator is reset to be the number of field references that refer to the iterator plus the number of child iterators of this iterator. The iterator's state is set to NEEDS_RESTART.

Each input iterator can be in one of the states below. The states refer generally to the action to be taken when the iterator is referenced.

NEEDS_RESTART—Either no data is associated with the iterator because it has not yet been referenced, or the iterator has reached the end of its data. Next time it is referenced it must be reset to the beginning.

NEEDS_BUMP—All of the references to this iterator have been satisfied and the next time the iterator is referenced, it needs to be incremented to point to the next element.

NEEDS_CHECK—The iterator has just been set to a new element, so any constraints associated with the iterator or its sequence need to be evaluated against the element.

NORMAL—References remain to be satisfied and the iterator has data associated with it. At this point it can actively be used to access data.

DONE—The iterator has reached the end of its data and cannot be restarted. This is for example the case in after the references have been satisfied for the iterator associated with the input message, since there is only one input message.

As described above during the execution of the transformation, the input iterator refers to the content of the fields of the input message. The iterator also keeps track of the current element in the sequence over which it iterates. The iterator contains a count of the number of field references and child iterators that refer to the iterator. This is used to determine when the iterator should move to the next element in its sequence.

During the execution of a schema node, the iterator can be marked as "disabled" which means the field references associated with that iterator are not available. As will be shown below, the main processing loop involves repeated execution of output sequences using the data associated with input iterators. An input iterator is disabled in order to allow descendent iterators to be processed without getting duplicate data. The exact procedure for this is discussed in the Iterator Reference section below.

Input iterator objects are arranged in a tree.

In certain cases, the iterator tree used during the execution of the transformation is different than the iterator tree provided from the configuration. The difference is that extra iterators are inserted into the tree when the transformation begins to execute. This is required to allow the execution engine to properly access the data associated with the iterator.

An example is shown to best illustrate this. Consider the following iterator tree:
@customer
  @orders
    @items
      @ordersForItems In this case we insert a newly created iterator over the customer sequence as the parent of the @ordersForItems iterator, resulting in the following tree:
@customer
  @orders
    @items
      @customer-1 (inserted)
        @ordersForItems In this example, @ordersForItems is the child iterator, and @items is the parent iterator (before the tree was modified). In the sequence associated with the parent iterator (items) is at a lower level than the sequence associated with its child iterator (orders), and the sequence associated with the child iterator is not the root container. If this situation occurs, additional iterators must be inserted. An iterator is created and inserted for the root container (which is always a sequence because the message is treated as a sequence). An additional iterator is created and inserted for any other sequence between the root container and the sequence associated with the child iterator.

Output Iterator Object

Each output iterator object refers to an expression that defines the number of times the iterator executes. When an output schema node is executed which is associated with an output iterator, this expression is evaluated.

Representation of the Message Data

Each message is represented by an object that contains the data associated with the message. The transformer reads on a single input message at a time, and produces a single output message at a time. Various mechanisms may be used within a message object to represent the message data. For the purpose of the description of the present invention, the message data is represented as a set of sequences corresponding to the schema of the message.

Each field in the message is represented as an object that contains the data associated with that field, and any necessary characteristics of the field. For example, the number 661104 would be represented by an "integer" object containing that value.

Consider the Customer example schema above from FIG. 3. While FIG. 1 shows the standard representation of an example message that contains three orders where each order contains three items, FIG. 6 shows a detailed example where each of the three items is further broken down into their corresponding elements.

When accessing data from the message, the correct array is determined, and the position in the array is determined which is either the number of the field within a container, or the number of the element within a sequence, depending on whether the array represents a sequence or container.

Reason Count

The overall process of producing output messages involves populating fields in the output while referring to the input data, which may iterate according to the specification of an input iterator.

In most cases, because the evaluation of an expression results in data that can immediately be placed in the output field, the output field (and its corresponding schema node) is considered for processing only once.

However in cases involving the use of many-to-one expressions, the evaluation of the expression tree for a given field may just accumulate data from the input in order to eventually produce a result once all of the input data has been processed. An example of this is a "sum" function which computes the sum of the values of a given field for all elements in a sequence. This function is executed by calling its "iterate" method for each element in the sequence, and after the last element is processed, its "getResult" method is called to obtain the sum of the elements. In these cases, we need to continue to re-evaluate that expressing tree for each element of input sequence.

The mechanism for handling this is called the "reason count" which is an abbreviation for number of reasons to continue evaluation. The reason count is returned whenever an expression tree is evaluated, and whenever an output schema node is executed. For output schema nodes that are containers, the sum of the reason counts is returned. If the reason count at the root output schema node is non-zero, the root schema node is re-executed.

Execution Steps

The following steps are done after each input message is received:

1) If this is the first message received, create the additional iterators if necessary as described in the Input Iterator Object section above.
2) Prepare the transformation objects for a new message. In particular, initialize every input iterator object as described in the Iterator Object section above.
3) Begin creating an output message by processing the root output schema using the "Processing Output Schema Node" procedure.
4) If the reason count returned by executing in the procedure in step 3 is non-zero, go back to step 3. Otherwise, go to step 2.

This procedure is illustrated in the flowchart in FIG. 9.

Processing an Output Schema Node

This section describes how the data in the output message corresponding to an output schema node is prepared. As stated above, a schema node can contain other schema nodes, each of which may be a leaf (representing an output field) or an intermediate (representing a container) node.

In the simple case, where the schema node is a leaf, the expression associated with this schema node is evaluated according to the "Evaluating an Expression" process, and subject to the rules specified in the "Output Iterators/Many Output Expressions" process. If the expression evaluation throws "result not ready", the one is added to the number of reasons why the expression must be revisited. This value is returned as the result of this output schema node evaluation.

In the case where the output schema node is an intermediate, each of its children are evaluated in turn using this procedure, and the sum of the returned reason counts is calculated. Once this is complete, the state of the input iterator object associated with this schema node is checked to determine is it is finished with this iteration. This is covered in the "Iterator Done Check" procedure. If the check returns not done, then one is added to the reason count.

The reason count is returned.

This procedure is illustrated in the flowchart in FIG. 9.

Expression Tree Evaluation

This describes the details of how the expression tree associated with each output field is processed. This includes the processing of functions, formal parameters, and constraints. In addition to the population of a field in the output message, the result of evaluating an expression tree is the reason count, which is the number of reasons why this tree needs to be revisited.

When an output schema node is executed, the single expression associated with the schema node is evaluated. As described in VITFRU1, this expression may be either a function or field reference. In general, the evaluation of functions, field references, and formal parameters is done using the same process. This depends on the iteration properties of the expression specified above. The following steps are taken:

1) If a constraint is associated with the expression, it is evaluated. If the constraint returns false, a "no result" exception is thrown, and the remainder of the expression tree is referenced using the "Reference Expression Tree" process. If the constraint returns true, evaluation proceeds as if no constraint was specified.
2) If the expression is many-to-many or many-to-one, and if sequential parameters are specified, there is "current parameter" associated with the expression. Recall that the meaning of sequential parameters is that the parameters are processed in sequence rather than all at once. All of the elements of the first (current) parameter are processed before the second parameter is considered. When all of the elements of a parameter have been processed, the parameter is marked "done" and the next parameter becomes the current parameter. If there is no next parameter, this procedure continues at step 4. The "iterate" method is called on this expression with the number of the current parameter specified as an argument. Like the "getResult" method below the "iterate" method may evaluate its parameters, with the additional restriction that it may only evaluate the current parameter. The "Iterator Done" procedure is executed on the iterator associated with the parameter. If the iterator is done, the parameter is marked "done" (as described above). If the last parameter is "done", continue to step 4, otherwise this procedure terminates by throwing "result not ready."
3) If the expression is many-to-many or many-to-one, and if sequential parameters are not specified, the "iterate" method is called. Like the "getResult" method below the "iterate" method may evaluate its parameters. Then the "Iterator Done" procedure is executed for the iterator associated with the expression. If the iterator is done, execution continues at step 4. Otherwise, this procedure terminates by throwing "result not ready".
4) The "getResult" method is called on the expression. If the expression is a field reference or formal parameter, this results in the execution of the "Field Reference Evaluation" or "Formal Parameter Evaluation" procedures. With the execution of the "getResult" method, the expression may request the value of one or more of its parameters. If this is done, this "Evaluate Expression Tree" procedure is executed on that parameter. Once the processing of the "getResult" method is complete, the results are returned and become the result of this procedure. For example, a concatenation function gets the value of each of its parameters and returns as its result the concatenation of those values.

This procedure is illustrated in the flowchart in FIG. 12.

Formal Parameter Evaluation

This procedure is executed when "getResult" is called on a formal parameter expression.

Each of the formal parameter's parameters are evaluated in turn using the "Expression Tree Evaluation" procedure. The first parameter that does not throw a "no result" exception is returned as the result of the evaluation of the formal parameter. If all of the parameters throw a "no result" exception, the formal parameter itself throws a "no result" exception.

Field Reference Evaluation

This procedure is executed when "getResult" is called on a field reference expression. The following steps are taken:
1) The "Iterator Reference" procedure is executed.
2) The field's value is obtained using the "Getting Input Message Data" procedure.
The field's value is returned.

Iterator Done Check

This check determines if the input iterator associated with a given output schema node needs further processing with respect to the output schema node. If no such further processing is needed, done is the result of this check; otherwise, not done is the result of this check.

If the iterator is currently disabled, not done is returned.

If an input iterator is in the NEEDS_RESTART or DONE state, or the current position of the iterator is at the last element of the sequence over which it iterates, then that iterator is considered done.

If the iterator associated with the schema node, or any of its ancestors that are also descendents of the iterator associated with the schema node's parent are not done, not done is returned. Otherwise, done is returned.

This procedure is illustrated in the flowchart in FIG. 9.

Getting Input Message Data

This describes the mechanism that is used to reference the desired field from the input message, based on the current position of the relevant iterators. This is used in two situations:
1) When getting the return value for a field reference; and
2) When getting the data to be associated with an iterator.

Each iterator contains a pointer to the array of the data under the control of that iterator, with respect to its parent iterator. This is shown in FIG. 7. This data is available to be accessed when the iterator is in the NORMAL state. The pointer actually points to the element at the current index of the iterator. For example, referring to FIG. 7, the @order iterator, is pointing to the first order in the order array; and the @item iterator is pointing to the second item in the item array.

The iterator and schema node objects work together to get the desired field from the input message. As discussed above, the iterator points to the data array at the correct element, and the schema node(s) are used to compute the location of the field within a particular container. The schema node has the offset in the array of its field/container relative to its parent schema node. So the iterator is used to find the particular element, and the schema node is used to locate the field within the element.

There are some cases where there are nested containers. This is illustrated in FIG. 8. In order to access the city field (using the field reference "customer.address.city", the information from the iterator @customer points to the first (and only in this case) customer element in the array; this in turn points to the data associated with the customer element. The customer schema node is associated with the @customer iterator. The address schema node is a child of the customer schema node; the address schema node is at offset 1 from the start of the customer data. This is a pointer to the address data. The city schema node is a child of the address schema node, using the offset of the city relative to the address, which is one, the pointer to the city field's data is found.

Iterator Reference

The following steps occur:
1) If the state of the iterator is NEEDS_RESTART, its parent iterator is referenced by invoking this procedure on it. If the iterator has no parent iterator, it is loaded with the data from the top-level sequence. Once the parent iterator has its data, this iterator is loaded with data using the "Getting Input Message Data" procedure. The state of the iterator is set to NEEDS_CHECK.
2) If the state of the iterator is NEEDS_BUMP, the index is incremented, and all of the children iterators of this iterator have their state set to NEEDS_RESTART. The state of the iterator is set to NEEDS_CHECK.
3) If the state of the iterator is NEEDS_CHECK, and there is a constraint associated either with this iterator or this iterator's associated input sequence, the constraint is evaluated. If the result is true, set the state to NORMAL and continue to step 4. If the result is false, increment the index associated with this iterator such that the next element is available, and go to step 2.
4) The reference count is reduced by one. If the reference count is zero, set the state to NEEDS_BUMP, and reinitialize the reference count as described in the Iterator Object section. If this iterator is not the root iterator, and the parent iterator is not in the DONE state, disable the parent iterator.
5) If the index of the iterator is set to the index of the last element in the sequence, and the reference count is at its initial value: If the iterator is the root iterator (of the iterator tree), or the parent iterator is in the DONE state, set the state to DONE; otherwise set the state to NEEDS_RESTART, and enable the parent iterator.

This procedure is illustrated in the flowchart in FIG. 10.

Reference Expression Tree

In order for an iterator to go to the next item, all of the references from child iterators and field references must be satisfied. There are however cases when some field references are not processed. This can occur if a constraint in an expression tree evaluates to false resulting in some portion of the expression tree not being executed. In this case, this procedure finds the field references that were not executed because of the false constraint the references the iterator associated with each of those field references.

The other situation in which this can occur is when an expression tree has already been evaluated, but the schema node referring to the expression tree is being evaluated a subsequent time due to the loop associated with the root output schema node (see Execution Steps section above). In this case, the iterators associated with each of the field references in the expression tree are referenced.

Output Iterators/Many Output Expressions

If the function at the root of the output schema node's expression tree is a function with an iteration property of one-to-many or many-to-many, the output schema node is executed once per value returned by the function.

If an output iterator is associated with an output schema node, that schema node is executed once for each iteration of the output iterator. The number of times the output iterator iterates is determined by evaluating the expression associated with the output iterator. This is done each time an output schema node is executed (when it is associated with an output iterator).

If both a function returning many values and an output iterator are associated with the same output schema node, the schema node is executed for each return value from the function, and within that, for each occurrence of the output iterator.

In any of the above sequences of execution, before the first iteration of the output schema node, the state of all input iterators are saved, and this state is restored before every output iteration.

The procedure is illustrated in the flowchart in FIG. 11.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer-implemented process for transforming an input message to an output message comprising the steps of:
   reading transformation configuration information;
   reading an input message;
   creating output message data corresponding to each output schema node;
   calculating a reason count, wherein the reason count is the number of reasons to continue for each schema node;
   performing the steps until the reason count becomes zero; and
   writing the output message,
   wherein said output message data is created using a tree-view by accessing an input tree on demand to satisfy output node computations and an input message.

2. A computer-implemented process as in claim 1, wherein said input tree is partially traversed and the traversal terminates when said reason count becomes zero.

3. A computer-implemented process for transforming an input message to an output message comprising the steps of:
   preparing a database of input schema;
   preparing a database of output schema;
   selecting an input schema from said database of input schema;
   adding transformation constructs to said input schema, wherein said transformation constructs define rules for building a particular output field;
   selecting an output schema from said database of output schema;
   adding transformation constructs to said output schema, wherein said transformation constructs define rules for building a particular output field;
   selecting an application program as an input;
   generating a tree representing an input schema;
   generating a tree representing an output schema;
   selecting an output field to receive an expression tree that defines the content of the output field;
   building said output field; and
   displaying said output field.

4. A computer-implemented process as in claim 3, wherein said transformation construct comprises at least one expression tree.

5. A computer-implemented process as in claim 4, wherein said at least one expression tree is a field reference.

6. A computer-implemented process as in claim 4, wherein said at least one expression tree is a function.

7. A computer-implemented process as in claim 4, wherein said at least one expression tree is a formal parameter.

8. A computer-implemented process as in claim 4, wherein said at least one expression tree is a constraint.

9. A computer-implemented process for transforming an input message to an output message comprising the steps of:
   selecting an input node to feed a transformation rule for an output node;
   adding transformation configuration constructs to an input schema;
   adding transformation configuration constructs to an output schema, wherein said constructs added to said input schema and to said output schema provide execution control of the transformation;
   calculating a reason count, wherein the reason count is the number of reasons to continue accumulating data for each schema node;
   associating said reason count at a root output schema node;
   accumulating data from said input schema by traversing an output tree until said reason count becomes zero;
   producing an output message that is a final result from said accumulated data; and
   writing said output message.

* * * * *